US012686127B2

(12) United States Patent
Stoeffler et al.

(10) Patent No.: US 12,686,127 B2
(45) Date of Patent: Jul. 21, 2026

(54) APPARATUS, DEVICE, METHOD AND COMPUTER PROGRAM FOR AN AUTONOMOUSLY ACTING MACHINE OR A COMPUTER SYSTEM

(71) Applicant: Intel Corporation, Santa Clara, CA (US)

(72) Inventors: Norbert Stoeffler, Graefelfing (DE); Florian Geissler, Munich (DE); Michael Paulitsch, Ottobrunn (DE)

(73) Assignee: Intel Corporation, Santa Clara, CA (US)

( * ) Notice: Subject to any disclaimer, the term of this patent is extended or adjusted under 35 U.S.C. 154(b) by 118 days.

(21) Appl. No.: 18/393,735

(22) Filed: Dec. 22, 2023

(65) Prior Publication Data

US 2024/0335947 A1 Oct. 10, 2024

(30) Foreign Application Priority Data

Apr. 5, 2023 (DE) .......................... 102023108687.1

(51) Int. Cl.
*B25J 9/16* (2006.01)
*B25J 19/02* (2006.01)

(52) U.S. Cl.
CPC ........... *B25J 9/1671* (2013.01); *B25J 9/1674* (2013.01); *B25J 19/02* (2013.01)

(58) Field of Classification Search
None
See application file for complete search history.

(56) References Cited

U.S. PATENT DOCUMENTS

2022/0063097 A1* 3/2022 Szabó ..................... B25J 9/1664
2022/0171907 A1* 6/2022 Chang .................... G06N 3/047
2022/0197306 A1* 6/2022 Cella ..................... B29C 64/386
(Continued)

OTHER PUBLICATIONS

"Robots and robotic devices—Collaborative robots", ISO/TS 15066, First edition Feb. 15, 2016, https://www.iso.org/standard/62996.html, downloaded: Oct. 1, 2021.
(Continued)

*Primary Examiner* — Arslan Azhar
(74) *Attorney, Agent, or Firm* — 2SPL Patent Attorneys PartG mbB; Yong Beom Hwang

(57) ABSTRACT

The apparatus for the autonomously acting machine comprises an interface for communicating with a computer system, wherein the computer system is separate from the autonomously acting machine. The apparatus includes a processor for executing machine-readable instructions for providing information about an internal state of the autonomously acting machine to the computer system, obtaining a feedback signal from the computer system, the feedback signal indicating whether sensor data for observing the autonomously acting machine is consistent with the internal state of the autonomously acting machine, and wherein the feedback signal is based on a comparison between a digital twin of the autonomously acting machine and the sensor data, wherein an internal state of the digital twin is based on the internal state of the autonomously acting machine, and operating the autonomously acting machine based on the feedback signal.

19 Claims, 6 Drawing Sheets

(56)  References Cited

U.S. PATENT DOCUMENTS

2022/0300875 A1 *  9/2022  Ams  ..................... B25J 9/1674

OTHER PUBLICATIONS

A. Parrott, W. Lane, "Industry 4.0 and the digital twin—
Manufacturing meets its match", New York: Deloitte University
Press, pp. 1-17, https://www2.deloitte.com/content/dam/Deloitte/kr/
Documents/insights/deloitte-newsletter/2017/26_201706/kr_insights_
deloitte-newsletter-26_report_02_en.pdf, published: 2017, down-
loaded: Dec. 2023.
"Road vehicles—Safety of the intended functionality", ISO/TC22/
SC32, Committee draft, Nov. 15, 2017.
"Draft proposed first edition of the standard for safety for the
evaluation of autonomous products", UL 4600, Version Jun. 27,
2019.

* cited by examiner

APPARATUS, DEVICE, METHOD AND COMPUTER PROGRAM FOR AN AUTONOMOUSLY ACTING MACHINE OR A COMPUTER SYSTEM

TECHNICAL FIELD

Examples relate to an apparatus, a device, a method, and a computer program for an autonomously acting machine, to an autonomously acting machine, to an apparatus, a device, a method, and a computer program for a computer system, and to such a computer system.

BACKGROUND

Autonomous robots can interact flexibly with their environment without being directly supervised by a human or computer-assisted external operator or without moving along a fixed, predetermined path or predetermined motion pattern. These robots use sensors that enable them to sense, understand and interpret their environment, which helps them to perform their task efficiently and in the best possible way. Various types of sensors are used, from simple ultrasonic distance sensors to powerful depth camera systems. These sensors are either attached to the robot itself or are part of the stationary infrastructure.

BRIEF DESCRIPTION OF THE FIGURES

Some examples of apparatus and/or methods will be described in the following by way of example only and with reference to the accompanying figures, in which.

DESCRIPTION

Figure 1A:
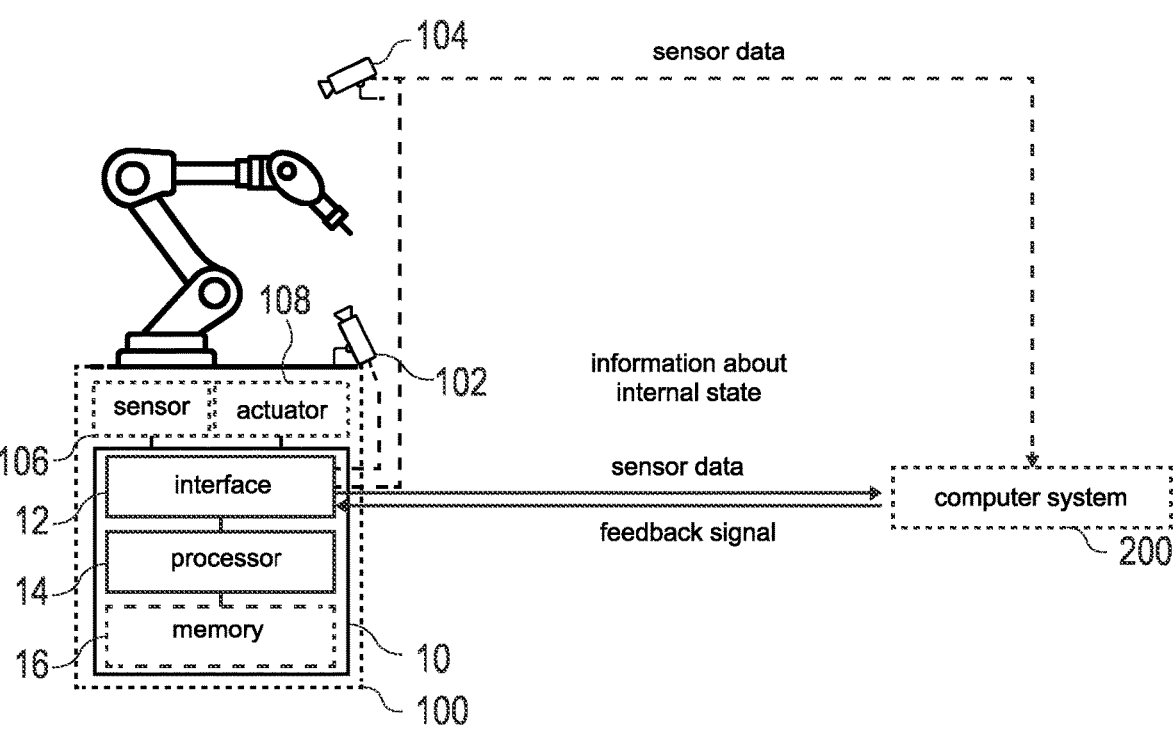
FIG. 1a shows a schematic representation of an example of an apparatus or a device for an autonomously acting machine and of an autonomously acting machine comprising such an apparatus or such a device.

Some examples are now described in more detail with reference to the enclosed figures. However, other possible examples are not limited to the features of these embodiments described in detail. These may include modifications of the features as well as equivalents and alternatives to the features. Furthermore, the terminology used herein to describe certain examples should not be restrictive of further possible examples.

Throughout the description of the figures, same or similar reference numerals refer to same or similar elements and/or features, which may, in each case, be identical or imple-mented in a modified form while providing the same or a similar function. The thickness of lines, layers and/or areas in the figures may also be exaggerated for clarification.

When two elements A and B are combined using an 'or', this is to be understood as disclosing all possible combinations, i.e., only A, only B as well as A and B, unless expressly defined otherwise in the individual case. As an alternative wording for the same combinations, "at least one of A and B" or "A and/or B" may be used. This applies equivalently to combinations of more than two elements.

If a singular form, such as "a," "an" and "the" is used and the use of only a single element is not defined as mandatory either explicitly or implicitly, further examples may also use several elements to implement the same function. If a function is described below as implemented using multiple elements, further examples may implement the same function using a single element or a single processing entity. It is further understood that the terms "include", "including", "comprise" and/or "comprising", when used, describe the presence of the specified features, integers, steps, operations, processes, elements, components and/or a group thereof, but do not exclude the presence or addition of one or more other features, integers, steps, operations, processes, elements, components and/or a group thereof.

FIG. 1a shows a schematic representation of an example of an apparatus 10 or a device 10 for an autonomously acting machine 100 and of an autonomously acting machine 100 comprising such an apparatus 10 or such a device 10. The apparatus 10 comprises circuits that provide the functionality of the apparatus 10. For example, the circuits of the apparatus 10 may be configured to provide the functionality of the apparatus 10. The apparatus 10 of FIG. 1a comprises, for example, an interface (or interface circuit) 12, a processor 14 and (optionally) a memory (or memory circuit) 16. The processor 14 may be coupled to, e.g., the interface 12 and to the memory 16. Thus, the processor 14 may be used in conjunction with the interface 12 (for exchanging information, e.g., with other components within or external to the autonomously acting machine 100 comprising the apparatus or the device 10, such as a computer system 200 that is separate from the autonomously acting machine, a sensor 102 (such as a camera sensor) of the autonomously acting machine, a sensor 104 (such as a camera sensor) external to the autonomously acting machine, or one or more sensors 106 and/or actuators 108 of the autonomously acting machine) and the memory 16 (for storing information, such as machine-readable instructions) to ensure the functionality of the apparatus. Likewise, the device 10 may comprise corresponding means to provide the functionality of the device 10. For example, the means may be intended to provide the functionality of the device 10. The components of the device 10 are defined as component means that correspond to or may be implemented by the respective structural components of the apparatus 10. For example, the device 10 of FIG. 1a comprises calculating means 14 that correspond to the processor 14 or may be implemented by the processor, communication means 12 that correspond to the interface 12 or may be implemented by the same, and (optional) means for storing information 16 that corresponds to the memory 16 or may be implemented by the same. In general, the functionality of the processor 14 or the calculating means 14 may be provided by the processor 14 or the calculating means executing machine-readable instructions. Accordingly, any functionality attributed to the processor 14 or the calculating means 14 may be defined by one or more instructions from a plurality of machine-readable instructions. The apparatus 10 or the device 10 may include the machine-readable instructions, for example, in the memory 16 or in the means for storing information 16.

The processor 14 or the calculating means 14 is configured to provide information about an internal state of the autonomously acting machine and, optionally, sensor data for observing the autonomously acting machine for the computer system 200 (via the interface 12/the communication means 12). The processor 14 or the calculating means 14 is configured to obtain a feedback signal from the computer system (via the interface 12/the communication means 12). The feedback signal indicates whether the sensor data for observing the autonomously acting machine is consistent with the internal state of the autonomously acting machine. The feedback signal is based on a comparison between a digital twin of the autonomously acting machine and the sensor data. An internal state of the digital twin is based on the internal state of the autonomously acting machine. The processor 14 or the calculating means 14 is configured to operate the autonomously acting machine based on the feedback signal.

FIG. 1*a* also shows an example of a system comprising the autonomously acting machine 100 and the computer system 200.

Figure 1B:
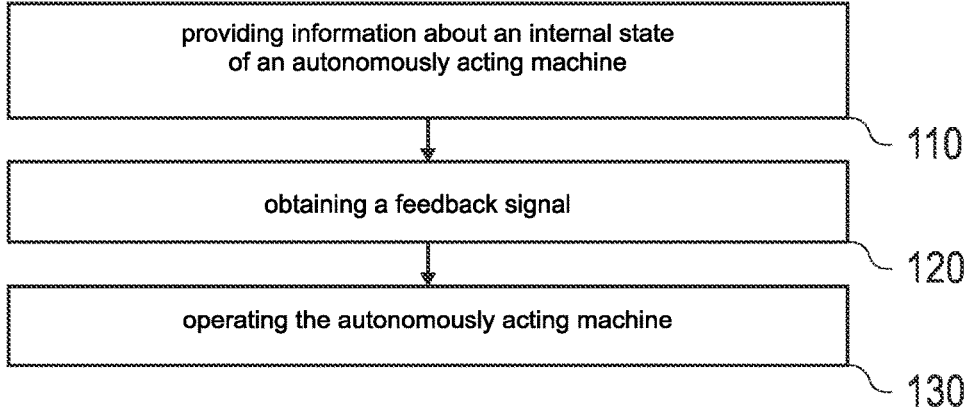
FIG. 1b shows a flowchart of an example of a method for an autonomously acting machine.

FIG. 1*b* shows a flowchart of an example of a corresponding method for the autonomously acting machine 100. The method comprises providing 110 the information about the internal state of the autonomously acting machine and, optionally, the sensor data for observing the autonomously acting machine to the computer system 200, wherein the computer system is separate from the autonomously acting machine. The method comprises obtaining 120 the feedback signal from the computer system 200. The method comprises operating 130 the autonomously acting machine based on the feedback signal. For example, the method is performed by the autonomously acting machine 100, such as by the apparatus 10 or the device of the autonomously acting machine 100.

In the following, the functionality of the apparatus 10, the device 10, the method, a corresponding computer program and the autonomously acting machine 100 is illustrated in relation to the apparatus 10. The features presented in connection with the apparatus 10 may also be comprised in the corresponding device 10, method, computer program and autonomously acting machine 100.

The present disclosure relates to the management and control (Steuerung und Kontrolle) of autonomously acting machines. In this context, an autonomously acting machine is a machine that performs a task based on predetermined programming and based on sensor data, without each work step of the autonomously acting machine being controlled by an external entity. In other words, the autonomously acting machine performs the work steps autonomously in accordance with the predetermined objectives and programming, without the need for additional management by an external entity. For this purpose, the autonomously acting machine processes sensor data from one or more sensors 102, 106 of the autonomously acting machine and, based on the sensor data and based on the objectives and the predetermined programming, controls one or more actuators 108 of the autonomously acting machine. This may be carried out, for example, by the apparatus 10, and/or in particular by the processor 14 of the apparatus 10. By driving the one or more actuators, at least one component of the autonomously acting machine is moved, such as an arm of the autonomously acting machine in the case of an industrial robot or a humanoid robot, or a drive of the autonomously acting machine for moving the autonomously acting machine within an environment. The autonomously acting machine may therefore be an industrial robot, for example, i.e., a robot for processing workpieces (e.g., by welding, drilling, etc.), for gripping or for assembling workpieces. Such industrial robots generally have a robot arm that is used to carry out the aforementioned activities. Alternatively (or additionally), the autonomously acting machine may be a mobile robot, i.e., a robot that can change its position within an environment. In the following, the terms "autonomously acting machine" and robot are used synonymously. Consequently, a robot is also understood to be an autonomously acting machine, i.e., a machine that is not dependent on management by an external entity.

Although the autonomously acting machine is not controlled in detail by an external entity (i.e., for example, the actuators 108 are not controlled by the external entity), an external entity is used to increase the safety of the operation of the autonomously acting machine. For this purpose, both the internal state of the autonomously acting machine and sensor data showing the autonomously acting machine are transmitted to the computer system 200. This sensor data, or part of it, may be generated by one or more sensors 102 of the autonomously acting machine, for example. Additionally, or alternatively, the sensor data, or a part thereof, may be generated by one or more sensors 104 external to the autonomously acting machine, and transmitted to the computer system 200 either via the apparatus 10 or the autonomously acting machine 100, or transmitted to the computer system independently of the apparatus 10 or the autonomously acting machine 100, such as directly from the one or more sensors 104 to the computer system 200. For example, the one or more sensors 104 may be directly connected to the autonomously acting machine (such as the apparatus 10) or the computer system 200. Alternatively, the one or more sensors 104 may be connected to the autonomously acting machine (such as the apparatus 10) or the computer system 200 via one or more computer networks. For example, a camera sensor 102 may be attached to the robot (with a limited view of the autonomously acting machine, such as a view of a part of the autonomously acting machine and a direct environment of the autonomously acting machine), and/or a camera sensor 104 may be external to the autonomously acting machine but directly connected to the autonomously acting machine (and have the entire autonomously acting machine in view and/or the direct environment of the autonomously acting machine). For example, the camera sensor 102 (or another type of sensor) may be directly attached to or integrated into the robot, such as on a movable or immovable part of the body of the autonomously acting machine (such as on a robot arm). A camera sensor 104 (or another sensor) external to the autonomously acting machine may, for example, be mounted to a building or to a movable or immovable mount in the environment of the autonomously acting machine. By adjusting an orientation of the respective sensor, for example by adjusting a pan, tilt and zoom setting of the camera sensor, the sensor may be adjusted to the autonomously acting machine and/or the autonomously acting machine may be kept in a sensing range or image field of the respective sensor, for example when the autonomously acting machine is moving.

The computer system 200 uses the internal state of the autonomously acting machine to create and parameterize a so-called digital twin of the autonomously acting machine. A digital twin of a machine is a virtual model that may be used to depict and additionally simulate the behavior of the machine in the real world. Digital twins are used during development, for example, to test different product variants and scenarios and to optimize the design of the machine before it is actually built. In the present case, however, the digital twin is used to replicate the current state of the digital twin of the autonomously acting machine in the remote computer system 200. This makes it possible to predict how the autonomously acting machine should "look" (i.e., be represented) in the sensor data. The computer system 200 then compares this target representation with the sensor data received from the apparatus 10 for the autonomous machine, the autonomously acting machine or the respective sensor, and thereby determines whether the autonomously acting machine 100 is functioning properly. If there is a certain divergence between the simulated or predicted sensor data and the sensor data, this is communicated to the autonomously acting machine so that it can react appropriately, e.g., switch to a safe state. It does not matter why the discrepancy occurs (e.g., due to contamination or displacement of sensors, due to errors in the processing of sensor data by the autonomously acting machine, or due to malfunctioning actuators), as all these errors may potentially have serious consequences that can be avoided by reacting appropriately or assuming a safe state.

The proposed concept thus increases the safety of autonomously acting machines without requiring the use of redundant hardware in the respective autonomously acting machine, which makes the production of the machine more cost-effective. Establishing the fault on the remote computer system side allows both more accurate fault recognition, as remote computer systems have greater computing resources that allow better algorithms to be used, and improved fault recognition over time as soon as better algorithms or better hardware become available; furthermore, a remote central computer system may improve fault recognition by evaluating data from a plurality of autonomous machines. Although there is a latency until faulty states are reported, this is justifiable, as latency times are short, i.e., typically well below one second, with improved reliability or accuracy of fault recognition.

The proposed concept begins with the compilation and transmission of the necessary information to the remote computer system 200. For this purpose, the processor may be configured (by means of the machine-readable instructions) to receive the sensor data for observing the autonomously acting machine. The sensor data for observing the autonomously acting machine may, for example, be sensor data that enables the autonomously acting machine to be observed. Alternatively, or additionally, the sensor data for observing the autonomously acting machine may be sensor data acquired by observing the autonomously acting machine. For example, the processor may be configured to execute the machine-readable instructions in order to obtain the sensor data for observing the autonomously acting machine at least in part from at least one sensor 102 of the autonomously acting machine.

Alternatively, or additionally, the processor may be configured to execute the machine-readable instructions in order to obtain the sensor data for observing the autonomously acting machine at least in part from at least one sensor 104 external to the autonomously acting machine. For example, the sensor data may be obtained from one or more sensors within or external to the autonomously acting machine. The processor may be configured to execute the machine-readable instructions to read out or receive the sensor data from the respective sensor 102, 104. For example, the processor may be configured to execute the machine-readable instructions to receive or read out raw sensor data of the respective sensor and to generate the sensor data from the raw sensor data. Alternatively, the sensor data may include the raw sensor data. The processor may further be configured to execute the machine-readable instructions to compile the sensor data of multiple sensors for subsequent provision. To ensure synchronization with the internal state of the autonomously acting machine, the processor may further be configured to execute the machine-readable instructions, to timestamp the sensor data or to process a timestamp of the sensor data, and to provide the sensor data based on the timestamp together with the internal state of the autonomously acting state (described below). In some cases, at least a part of the sensor data may also be transmitted directly from one or more of the sensors 104 to the computer system 200.

In this context, the sensor data is suitable to observe, i.e., perceive, the autonomously acting machine. Accordingly, the sensor data shows at least one aspect or at least one component of the autonomously acting machine. In other words, at least a part of the autonomously acting machine is represented in the sensor data. Optionally, an environment of the autonomously acting machine may also be represented in the sensor data. For example, at least a part of the autonomously acting machine and/or the environment may be represented by the fact that at least a part of the autonomously acting machine and/or the environment is shown in the sensor data. Alternatively, or additionally, at least a part of the autonomously acting machine and/or the environment may be represented in the sensor data by the sensor data representing a relationship (such as a distance) between different components of the autonomously acting machine or between the autonomously acting machine and the environment. Various types of sensor data may be used here. For example, the sensor data may be at least one of camera sensor data (such as a camera or a camera with a depth sensor), infrared sensor data (such as an infrared camera or an infrared-based time-of-flight camera), depth sensor data (a depth sensor, such as a structured light sensor or a time-of-flight sensor) and ultrasonic sensor data (an ultrasonic sensor). Here, the camera sensor data, infrared sensor data, depth sensor data and ultrasonic sensor data may each depict at least a part of the autonomously acting machine and/or the environment. Additionally, or alternatively, infrared sensor data and depth sensor data and ultrasonic sensor data may further indicate the relationship between different components of the autonomously acting machine or between the autonomously acting machine and the environment.

In addition to the sensor data, the information about the internal state of the autonomously acting machine is also to be transmitted to the computer system. The information about the internal state of the autonomously acting machine represents the internal state of the autonomously acting machine. In this context, the internal state of the autonomously acting machine comprises (all) parameters that are necessary to simulate the state in the digital twin in the computer system. For example, the internal state of the autonomously acting machines is based on measurement data or actuation data of one or more sensors 106 or actuators 108 of the autonomously acting machine. Consequently, the processor may be configured to execute the machine-readable instructions to determine the internal state of the autonomously acting machines (for example, based on the measurement data and actuation data) and to generate the information about the internal state. For example, the processor may be configured to execute the machine-readable instructions to create a memory image of a state memory of the autonomously acting machine, and to determine the information about the internal state based on the memory image. Furthermore, the processor may be configured to execute the machine-readable instructions in order to transfer the actuation data and the sensor measurement data into the information about the internal state.

The information about the internal state of the autonomously acting machine is provided to the computer system (i.e., transmitted to the computer system). The information about the internal state of the autonomously acting machine may be provided together with the sensor data for the computer system, for example, within the same data transmission. In some examples, it is important that the sensor data and the internal state of the autonomously acting machine are time-synchronized. That is, the sensor data and the information about the internal state of the autonomously acting machine may be provided such that a time difference between a recording of the sensor data and between the internal state represented in the information about the internal state may be less than a time threshold, such as less than 50 milliseconds (ms), or less than 20 ms, or less than 10 ms, or less than 5 ms. The processor may be configured to execute the machine-readable instructions, to store the internal state together with a timestamp, and to provide the sensor data together with the information about the internal state of the autonomously acting machine to the computer system based on the timestamp of the sensor data and the timestamp of the internal state. Alternatively, the sensor data, or a part thereof, may be provided to the computer system independently of the apparatus 10 or the autonomously acting machine 100, such as from the one or more sensors 104 external to the autonomously acting machine 100.

Figure 3:
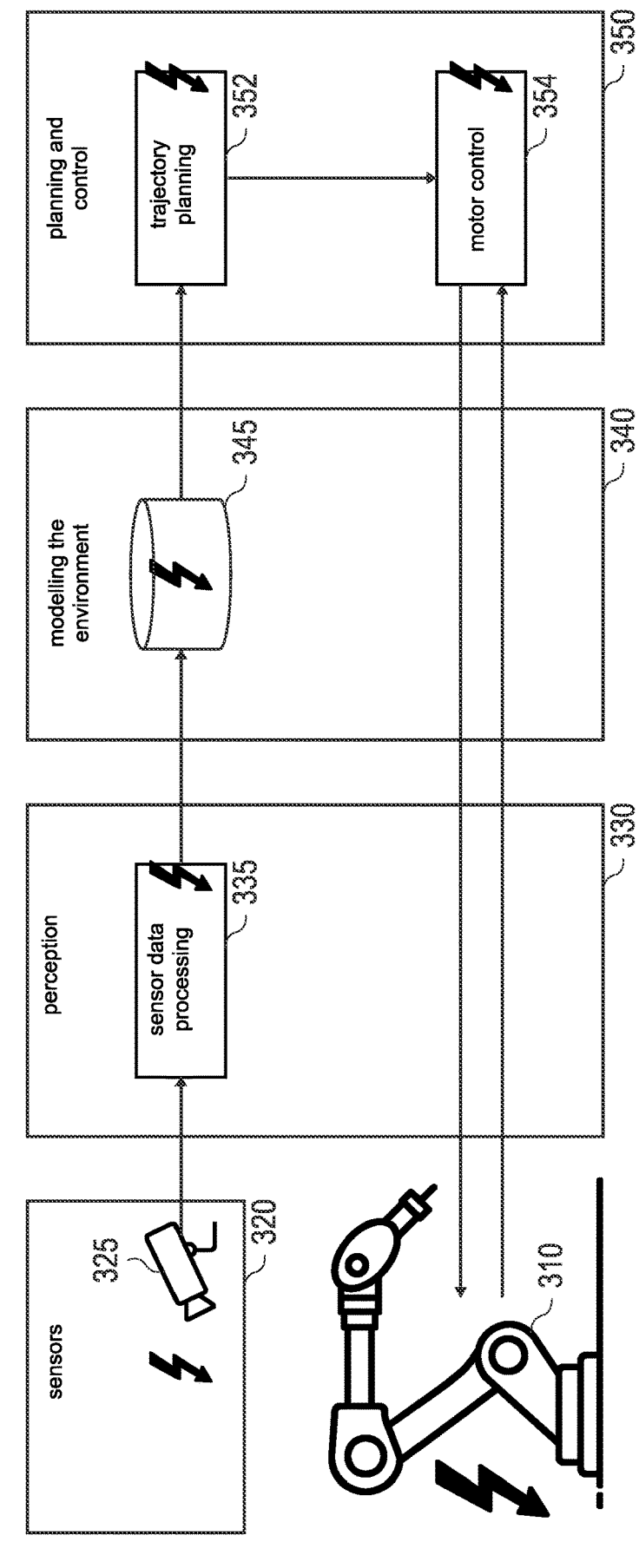
FIG. 3 shows an overview of an example of an industrial robot system, with flashes in the figure symbolizing possible faults in subcomponents.

In response to the provision of information about the internal state (and optionally the sensor data), the autonomously acting machine obtains the feedback signal. The feedback signal indicates whether the sensor data is consistent with the internal state of the autonomously acting machine. In other words, the feedback signal indicates whether a fault state exists, where the fault state exists if the sensor data is not consistent with the internal state of the autonomously acting machine. As explained above, the fault state may have various causes, such as a malfunction or contamination of the sensors, the actuators or a fault in the processing—an overview of the possible error sources is shown in FIG. 3. Regardless of which fault led to the fault state, if a fault state is present, i.e., if the sensor data is inconsistent with the internal state of the autonomously acting machine, it is advisable to put the autonomously acting machine into a safe state. This means that the processor may be configured to execute the machine-readable instructions in order to stop the autonomously acting machine based on the feedback signal (and thus transfer it to the safe state). Here, operating the autonomously acting machine based on the feedback signal means, for example, that the operation of the autonomously acting machine is either continued if the feedback signal indicates that the sensor data is consistent with the internal state of the autonomously acting machine, and stopped if the feedback signal indicates that the sensor data is inconsistent with the internal state of the autonomously acting machine.

In order to eliminate communication between the autonomously acting machine and the remote computer system 200 as a further source of error, it may be provided that the operation of the autonomously acting machine is stopped if the feedback signal fails to occur. In other words, the processor may be configured to execute the machine-readable instructions in order to stop the operation of the autonomously acting machine if the feedback signal fails to occur within a predetermined time frame. The failure to occur may be caused by a fault in the data communication between the autonomously acting machine and the computer system. In addition, the failure to occur may be due to the computer system suspending the provision of the feedback signal if a fault state has been identified.

In the previous examples, the fault state was related to the functioning of the individual components of the autonomously acting machine or to data transmission. However, it may also be possible for a fault state to occur without a malfunction on the part of the autonomously acting machine. This may be the case, for example, if the autonomously acting machine slips on an uneven face due to a slippery subsurface, or if a source of interference enters the environment of the autonomously acting machine. In some examples of the present disclosure, such fault states may also be recognized by the computer system, such as when the sensor data also represents the environment of the autonomously acting machine. Using the feedback signal, it is now possible to also communicate this fault state to the autonomously acting machine. For example, the processor may be configured to execute the machine-readable instructions in order to stop the operation of the autonomously acting machine if the feedback signal indicates that i) the sensor data is inconsistent with the internal state of the autonomously acting machine, that ii) an appearance of an environment of the autonomously acting machine does not correspond to an expected appearance, or that iii) the environment comprises one or more potential sources of interference. In some cases, the failure to occur of the feedback signal indicates that at least one of the above fault states i) to iii) has occurred. Alternatively, the feedback signal may contain information about which fault state has occurred.

The interface 12 or the communication means 12 may correspond to one or more inputs and/or outputs for receiving and/or transmitting information, which may be present in digital (bit) values according to a code within a module, between modules, or between modules of different entities. For example, the interface 12 or the communication means 12 may comprise a circuit configured to receive and/or transmit information. For example, the interface 12 or the communication means 12 may be configured to communicate with the computer system 200 via a network, and in particular via an intranet or the Internet.

The processor 14 or the calculating means 14 may, for example, be implemented using one or more processing units, one or more processing devices, any means for processing, such as a processor, a computer, or a programmable hardware component, which may be operated with accordingly adapted software. In other words, the described function of the processor 14 or the calculating means may as well be implemented in software, which is then executed on one or more programmable hardware components. Such hardware components may be a general-purpose processor, a digital signal processor (DSP), a microcontroller, etc.

The memory 16 or means for storing information 16 may comprise, for example, at least one element from the group of computer-readable storage media, such as a magnetic or optical storage medium, e.g. a hard disk drive, a flash memory, a floppy disk, a random access memory (RAM), a programmable read only memory (PROM), an erasable programmable read only memory (EPROM), an electronically erasable programmable read only memory (EEPROM) or a network memory. For example, the memory 16 can be a volatile or a non-volatile memory.

More details and aspects of the apparatus 10, the device 10, the apparatus, a corresponding computer program, and the autonomously acting machine 100 are mentioned in connection with the concept or examples described before or after, such as in one of FIGS. 2a to 6. The apparatus 10, the device 10, the method, the computer program, and the autonomously acting machine 100 may comprise one or more additional optional features corresponding to one or more aspects of the proposed concept or of the described examples as described above or below.

Figure 2A:
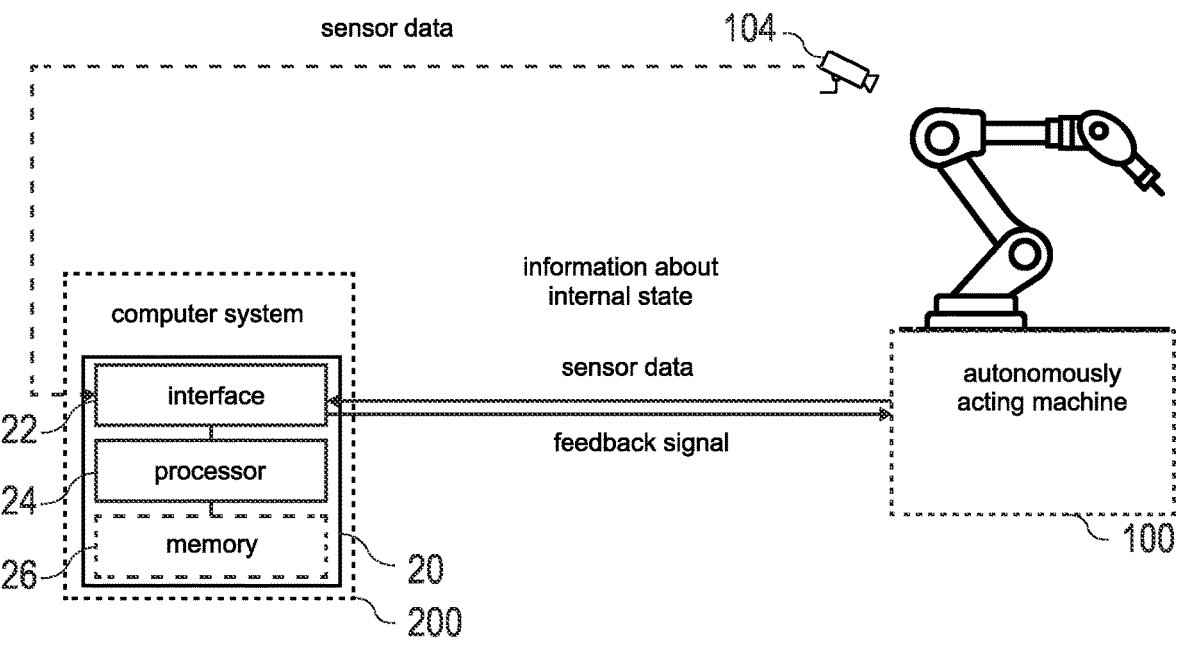
FIG. 2a shows a schematic representation of an example of an apparatus or a device for a computer system and of a computer system comprising such an apparatus or such a device.

FIG. 2a shows a schematic representation of an example of an apparatus 20 or a device 20 for a computer system 200 and of a computer system 200 comprising such an apparatus 20 or such a device 20. The apparatus 20 comprises circuits that provide the functionality of the apparatus 20. For example, the circuits of the apparatus 20 may be configured to provide the functionality of the apparatus 20. The apparatus 20 of FIG. 2a comprises, for example, an interface (or interface circuit) 22, a processor 24 and (optionally) a memory (or memory circuit) 26. The processor 24 may be coupled to, e.g., the interface 22 and to the memory 26. Thus, the processor 24, in conjunction with the interface 22 (for exchanging information, such as with other components within or external to the computer system 200 comprising the apparatus or the device 20, such as an autonomously acting machine 100 that is separate from the computer system 200, or one or more camera sensor(s) 104 for observing the autonomously acting machine that are attached external to the autonomously acting machine) and the memory 26 (for storing information, such as machine-readable instructions), may ensure the functionality of the apparatus. Likewise, the device 20 may comprise corresponding means to provide the functionality of the device 20. For example, the means may be intended to provide the functionality of the device 20. The components of the device 20 are defined as component means that correspond to or may be implemented by the respective structural components of the apparatus 20. For example, the device 20 of FIG. 2a comprises calculating means 24 that correspond to the processor 24 or may be implemented by the processor, communication means 22 that correspond to the interface 22 or may be implemented by the same, and (optional) means for storing information 26 that corresponds to the memory 26 or may be implemented by the same. In general, the functionality of the processor 24 or the calculating means 24 may be provided by the processor 24 or the calculating means executing machine-readable instructions. Accordingly, any functionality attributed to the processor 24 or the calculating means 24 may be defined by one or more instructions from a plurality of machine-readable instructions. The apparatus 20 or device 20 may comprise the machine-readable instructions, for example, in the memory 26 or in the means for storing information 26.

The processor 24 or the calculating means 24 is configured to obtain (for example, to receive) information about an internal state of the autonomously acting machine from the autonomously acting machine (for example, via the interface/communication means 22). The processor 24 or the calculating means 24 is configured to obtain (for example, to receive) sensor data for observing the autonomously acting machine, for example from the autonomously acting machine or from one or more sensors 104 external to the autonomously acting machine. The processor 24 or the calculating means 24 is configured to parameterize a digital twin of the autonomously acting machine based on the information about the internal state of the autonomously acting machine. The processor 24 or the calculating means 24 is configured to determine whether the sensor data is consistent with the internal state of the autonomously acting machine based on the parameterized digital twin. The processor 24 or the calculating means 24 is configured to provide a feedback signal to the autonomously acting machine (such as via the interface 22/the communication means 22), wherein the feedback signal indicates whether the sensor data is consistent with the internal state of the autonomously acting machine.

FIG. 2a also shows an example of a system comprising the autonomously acting machine 100 and the computer system 200.

Figure 2B:
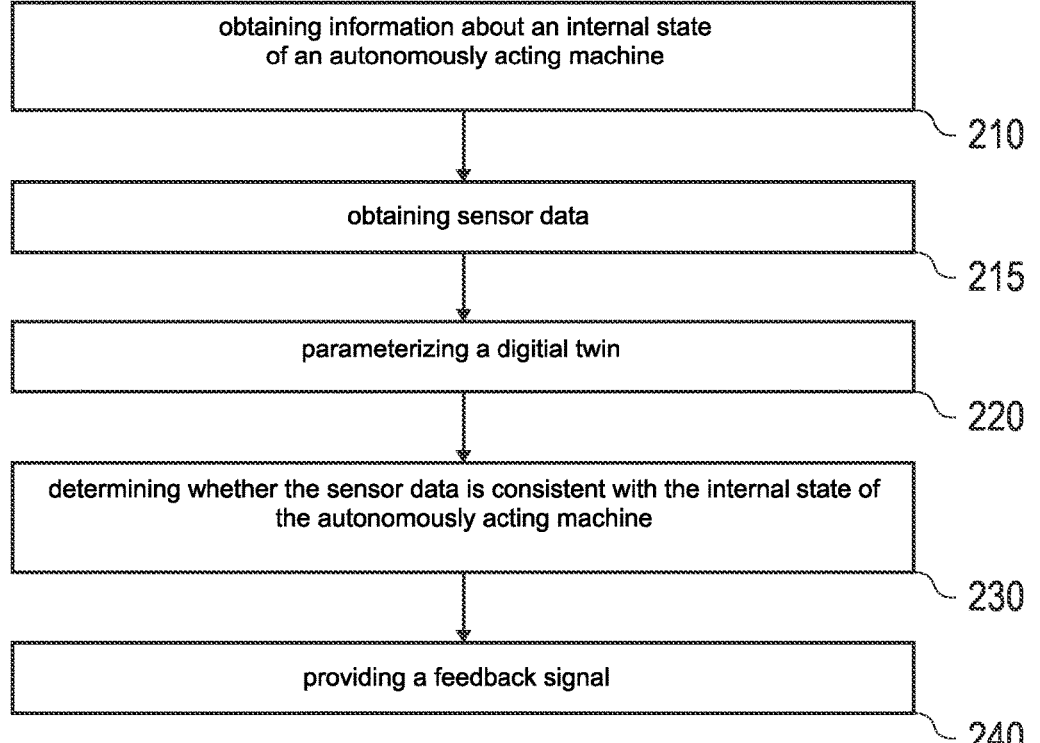
FIG. 2b shows a flowchart of an example of a method for a computer system.

FIG. 2b shows a flowchart of an example of a corresponding method for a computer system 200. The method comprises obtaining 210 the information about the internal state of an autonomously acting machine from the autonomously acting machine 100, which is separate from the computer system 200. The method comprises obtaining 215 the sensor data for observing the autonomously acting machine. The method comprises parameterizing 220 the digital twin of the autonomously acting machine based on the information about the internal state of the autonomously acting machine. The method comprises determining 230 whether the sensor data is consistent with the internal state of the autonomously acting machine based on the parameterized digital twin. The method comprises providing 240 the feedback signal for the autonomously acting machine. For example, the method may be performed by the computer system 200, such as the apparatus 20 or the device 20 of the computer system 200.

The functionality of the apparatus 20, the device 20, the method, a corresponding computer program and the computer system 200 with respect to the apparatus 20 is illustrated below. The features presented in connection with the apparatus 20 may also be comprised in the corresponding device 20, method, computer program and computer system 200.

While, in connection with FIGS. 1a and 1b, the functionality of the autonomously acting machine is explained, FIGS. 1a and 1b relate to the counterpart of the autonomously acting machine, the computer system 200. The computer system 200 is separate from the autonomously acting machine 100. For example, the computer system 200 may be connected to the autonomously acting machine via a computer network, such as an intranet or the Internet. Preferably, the computer system 200 is a cloud server, such as a server that provides a service to the autonomously acting machine. Accordingly, the computer system 200 may be a server computer system, i.e., a computer system used to provide services to one or more client computers. In the present case, the autonomously acting machine is a client of the computer system 200. For example, the computer system 200 may be located in the cloud, i.e., in a remote data center that is accessible via the Internet, or in the so-called edge, i.e., in a server that is separate but located in physical proximity to the autonomously acting machine or on or in physical proximity to a company site where the autonomously acting machine is deployed.

The computer system 200 receives information about an internal state of the autonomously acting machine from the autonomously acting machine. Furthermore, the computer system 200 receives the sensor data, for example from the autonomously acting machine 200 or from one or more sensors 104 external to the autonomously acting machine. Both the sensor data and the information about the internal state of the autonomously acting machine have already been described in connection with FIGS. 1a and 1b. These two data sets are used for two different purposes: The information about the internal state is used to parameterize the digital twin of the autonomously acting machine. The digital twin is in turn used to determine whether the sensor data is consistent with the internal state of the autonomously acting machine on which the digital twin is based. In the following, it is briefly explained how this comparison may be carried out.

As explained above, a digital twin of a machine is a virtual model that may be used to simulate the behavior of the machine in the real world. In the present case, the digital twin is used to replicate the current state of the digital twin in the remote computer system 200. For this purpose, the internal state of the autonomously acting machine is transferred to the digital twin, i.e., the digital twin is parameterized with the internal state of the autonomously acting machine. The internal state includes, for example, as described in connection with FIGS. 1*a* and/or 1*b*, measurement data and/or actuation data from sensors and actuators of the autonomously acting machine, and/or a state memory of the autonomously acting machine. Accordingly, the internal state of the autonomously acting machine also represents which positions or orientations the components of the autonomously acting machine have assumed and/or where the autonomously acting machine is (or thinks it is) in its environment. The former, i.e., what positions or orientations the components of the autonomously acting machine have assumed, may now be used to predict what the autonomously acting machine should look like (i.e., what appearance the autonomously acting machine should have), the latter, where the autonomously acting machine is (or thinks it is) in its environment, may be used to predict what the environment of the autonomously acting machine should look like (i.e., what appearance the environment should have).

The following procedure may be used to calculate the expected appearance of the autonomously acting machine. For example, the processor may be configured to execute the machine-readable instructions to calculate an expected appearance of the autonomously acting machine in the sensor data based on the digital twin. In particular, the processor may be configured to execute the machine-readable instructions to determine a geometry of the autonomously acting machine based on the digital twin, and to calculate the expected appearance of the autonomously acting machine based on the geometry of the autonomously acting machine. In addition, an expected appearance of the environment of the autonomously acting machine may also be calculated. For example, the processor may be configured to execute the machine-readable instructions to calculate an expected appearance of the environment of the autonomously acting machine (for example, based on the information about the internal state and/or based on knowledge about the environment of the autonomously acting machine).

The respective expected appearance may now be compared with the appearance contained in the sensor data to determine the feedback signal. Accordingly, at least a part of the autonomously acting machine and, optionally, an environment of the autonomously acting machine may be represented in the sensor data. Thus, the processor may be configured to execute the machine-readable instructions to compare the expected appearance of the autonomously acting machine with an appearance of the autonomously acting machine from the sensor data, and to provide the feedback signal based on the comparison. Additionally, the processor may be configured to execute the machine-readable instructions to compare the expected appearance of the environment of the autonomously acting machine with an appearance of the environment of the autonomously acting machine from the sensor data, and to provide the feedback signal based on the comparison. Thus, the processor may be configured to execute the machine-readable instructions to provide the feedback signal based on a comparison between the expected appearance of the environment and the representation of the environment of the autonomously acting machine from the sensor data. Since sources of interference are not included in the expected appearance of the environment of the autonomously acting machine, this comparison may therefore also be used to detect potential sources of interference. For example, the processor may be configured to execute the machine-readable instructions in order to detect one or more potential sources of interference in the representation of the environment of the autonomously acting machine from the sensor data, and to provide the feedback signal based on the detection of the one or more potential sources of interference.

In the previous examples, a comparison is made between a predicted appearance and the appearance contained in the sensor data. Here, the appearance is not necessarily limited to a camera image. Depending on the sensor used to generate the sensor data, an appearance of the autonomously acting machine or the environment of the autonomously acting machine may take on different forms. In addition to pixel-based images (in the case of camera sensor data), the sensor data may also include depth data (of a depth sensor/infrared sensor/sound sensor), for example in the form of a point cloud or in the form of a two-dimensional image in which the intensity of the image points indicates the distance. In such cases, a corresponding predicted appearance (such as a predicted point cloud, or a predicted two-dimensional image in which the intensity of the image points indicates the distance) may also be generated as an alternative to an appearance that reflects the appearance of the autonomously acting machine or the environment. The comparison may then include a (pixel-based or voxel-based) comparison of the respective predicted appearance and the appearance contained in the sensor data.

Figure 5:
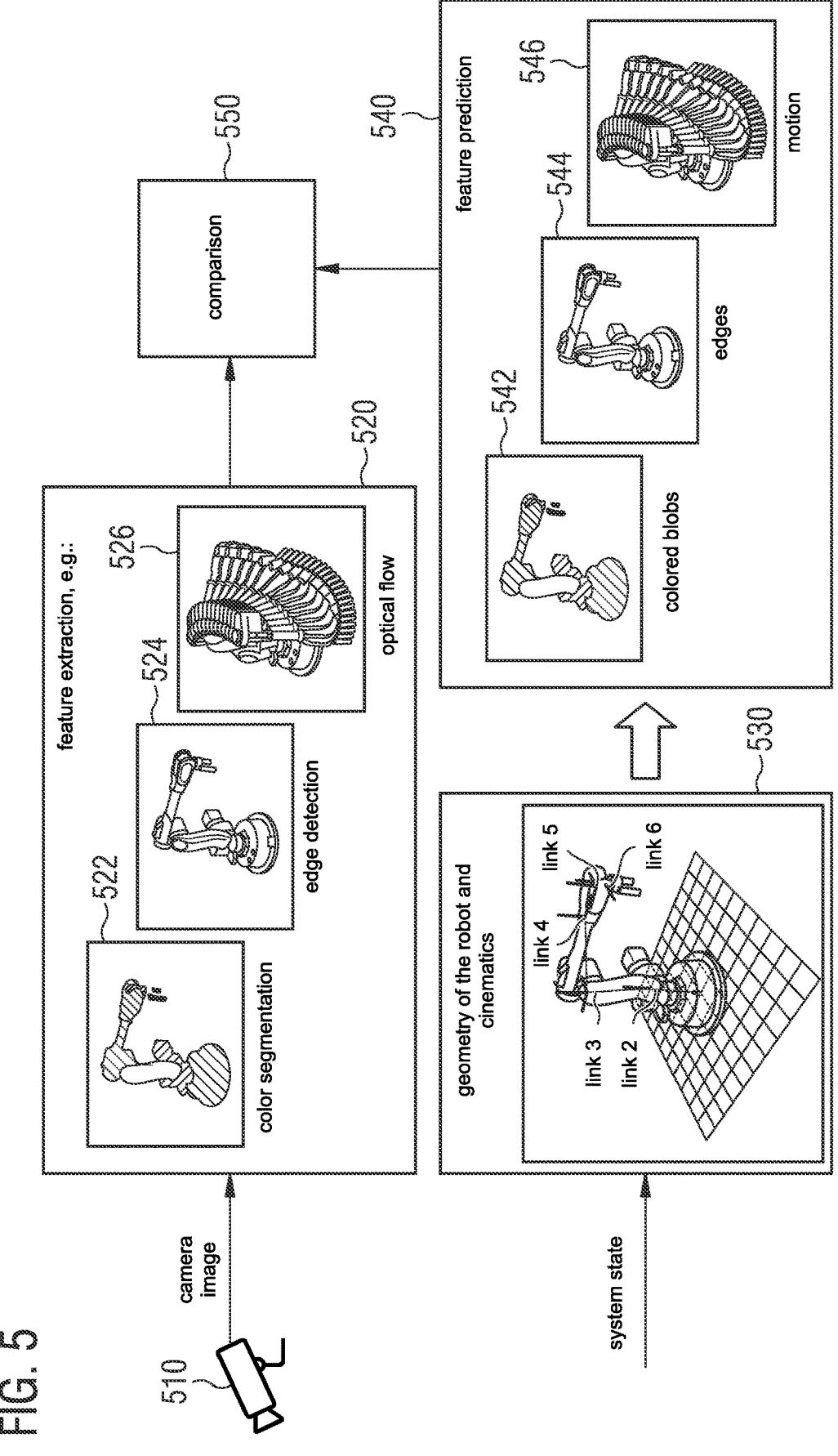
FIG. 5 shows an example of a comparison on feature level.

Alternatively, or additionally, feature extraction (or feature generation) may take place on both sides, i.e., on the sensor data side and on the predicted appearance side, so that the appearance is abstracted by means of a feature representation. For example, as shown in FIG. 5, the processor may be configured to execute the machine-readable instructions to extract features (such as blobs, edges, or optical flow) from the sensor data, for example using one or more machine learning models. For example, the processor may be configured to execute the machine-readable instructions to perform color segmentation using a machine learning model trained for color segmentation and output a segmentation map. Alternatively, or additionally, the processor may be configured to execute the machine-readable instructions in order to recognize and output edges in the sensor data by means of a machine learning model or by means of a (conventional) edge detection algorithm. Alternatively, or additionally, the processor may be configured to execute the machine-readable instructions in order to calculate the optical flow of a motion (i.e., a superposition of the appearances of the autonomously acting machine at several points of a motion) of the autonomously acting machine (for example within the environment) by means of a machine learning model or by means of a (conventional) image processing algorithm and to output it as image data. These features may now represent the appearance of the autonomously acting machine (and possibly the environment of the autonomously acting machine) in an abstracted form.

Corresponding features may now also be generated based on the parameterized digital twin and used as a predicted appearance. For example, the processor may be configured to execute the machine-readable instructions to process predicted image data/sensor data of the autonomously acting machine and/or the environment using the same feature extraction algorithms and machine learning models to generate the predicted appearance of the autonomously acting machine and/or the environment. Alternatively, as shown in FIG. 5, a feature representation may be generated directly. Here too, respective machine learning models may be used to directly generate the feature representation(s) of the predicted appearance based on the internal state of the digital twin (and thus the autonomously acting machine).

In the following, a brief introduction to machine learning is given, followed by a possible training of one or more machine learning models to extract or generate the respective features for the feature representation(s) of the predicted appearance and/or the appearance contained in the sensor data. Machine learning may refer to algorithms and statistical models that computer systems may use to perform a specific task without using explicit instructions, rather than relying on models and inference. In machine learning, for example, instead of a transformation of data based on rules, a transformation of data may be used that may be derived from an analysis of historical and/or training data. For example, the content of images may be analyzed using a machine learning model or using a machine learning algorithm. To enable the machine learning model to analyze the content of an image, the machine learning model may be trained using training images as input and training content information as output. By training the machine learning model with a large number of training images and/or training sequences (e.g., words or sentences) and associated training content information (e.g., labels or annotations), the machine learning model "learns" to recognize the content of the images so that the content of images not included in the training data may be recognized using the machine learning model. The same principle may also be used for other types of sensor data: By training a machine learning model using training sensor data and a desired output, the machine learning model "learns" a conversion between the sensor data and the output, which may be used to provide an output based on non-training sensor data provided to the machine learning model. The data provided (e.g., sensor data, metadata and/or image data) may be pre-processed to obtain a feature vector, which is used as input for the machine learning model.

Machine learning models may be trained using training input data. The examples above use a training method called "supervised learning". In supervised learning, the machine learning model is trained using a plurality of training input values, where each input value may comprise a plurality of input data values and a plurality of desired output values, i.e., each training input value is associated with a desired output value. By specifying both training input values and desired output values, the machine learning model "learns" which output value to provide based on an input input value (Eingabeeingangswert) that is similar to the input values provided during the training. In addition to supervised learning, semi-supervised learning may also be used. In semi-supervised learning, some of the training input values are missing a desired output value. Supervised learning may be based on a supervised learning algorithm (e.g., a classification algorithm, a regression algorithm or a similarity learning algorithm). Classification algorithms may be used when the outputs are restricted to a limited set of values (categorical variables), i.e., the input is classified as one of the limited set of values. Regression algorithms may be used if the outputs show any numerical value (within a range). Similarity learning algorithms may be similar to both classification and regression algorithms but are based on learning from examples using a similarity function that measures how similar or related two objects are. In addition to supervised learning or semi-supervised learning, unsupervised learning may be used to train the machine learning model. In unsupervised learning, (only) input data may be provided, and an unsupervised learning algorithm may be used to find a structure in the input data (e.g., by grouping or clustering the input data, finding commonalities in the data). Clustering is the assignment of input data comprising a plurality of input values into subsets (clusters) so that input values within the same cluster are similar according to one or more (predefined) similarity criteria, while they are dissimilar to input values comprised in other clusters.

Reinforcement learning is a third group of machine learning algorithms. In other words, reinforcement learning may be used to train the machine learning model. In reinforcement learning, one or more software actors (so-called "software agents") are trained to perform actions in an environment. A reward is calculated based on the actions performed. Reinforcement learning is based on training one or more software agents to select actions such that the cumulative reward is increased, resulting in software agents that become better at the task they are given (as evidenced by increasing rewards).

In the present context, one or more machine learning models may be used for color segmentation, edge detection or to generate an optical flow. Machine learning models that perform such feature extraction are widely used—here it is possible to use models that have already been trained. The training of these models is therefore not discussed below.

However, it may not be possible to generate the feature representation based on the internal state of the digital twin (and thus the autonomously acting machine) using a machine learning model that is already commercially available. For example, one or more machine learning models adapted to the application at hand may be trained for this purpose. Supervised learning, for example, may be used for this purpose. To generate the training data, the internal state of the autonomously acting machine and the associated sensor data may be stored over a large number of points in time. Care can be taken here to ensure that there is no fault state, i.e., that both the collection of sensor data and the operation of the autonomously acting machine are carried out without faults. The sensor data may then be processed using the one or more feature extraction machine learning models or image processing algorithms discussed above to generate the feature representation(s) of the sensor data. The feature representation(s) may now be used as desired output values, and the internal state of the digital twin may be used as training input values for training the respective machine learning model using supervised learning. In this way, the respective machine learning model is trained to generate a feature representation of an appearance of the autonomously acting machine based on the internal state of the digital twin. The same procedure may also be applied to the appearance of the environment, in which case the internal state of the digital twin and a representation (such as a map) of the environment may be used as (training) input data.

Alternatively, or additionally, the comparison between the respective predicted appearance and the appearance contained in the sensor data (or the feature representation thereof) may also be carried out using a machine learning model. For this purpose, a machine learning model may be trained as a classifier using supervised learning. In this case, (training) input data may comprise either the respective appearances or feature representations of the appearances, or the internal state of the digital twin and the appearance or feature representation of the appearance, and a label indicating whether the internal state is consistent with the sensor data or, more generally, whether there is a fault state, may be used as the desired output value. This trains the machine learning model to output an output based on the respective appearances or feature representations of the appearances, or based on the internal state of the digital twin and the appearance or feature representation of the appearance, indicating whether the internal state is consistent with the sensor data/whether a fault state exists.

The processor is now configured to execute the machine-readable instructions to provide the feedback signal based on the comparison between the digital twin and the sensor data. The feedback signal indicates whether the sensor data is consistent with the internal state of the autonomously acting machine or, more generally, whether a fault state exists. As mentioned in connection with FIGS. 1a and 1b, the feedback signal may be provided in various ways. On the one hand, the feedback signal may be suspended to indicate to the autonomously acting machine that a fault state exists. In other words, the processor may be configured to execute the machine-readable instructions in order to suspend the feedback signal if the sensor data is inconsistent with the internal state of the autonomously acting machine, if an appearance of an environment of the autonomously acting machine does not correspond to an expected appearance, or if the environment comprises one or more potential sources of interference.

This has the advantage that the autonomously acting machine also ceases its operation if the provision of the feedback signal fails due to communication difficulties, at the expense of a slightly greater latency of the notification. Alternatively, the feedback signal may be provided in such a way that it indicates that a fault state exists. Optionally, the feedback signal may also contain information about which fault state exists. In other words, the processor may be configured to execute the machine-readable instructions in order to provide the feedback signal such that the feedback signal indicates whether the sensor data is consistent with the internal state of the autonomously acting machine, whether an appearance of an environment of the autonomously acting machine corresponds to an expected appearance, and/or whether the environment comprises one or more potential sources of interference.

The interface 22 or the communication means 22 may correspond to one or more inputs and/or outputs for receiving and/or transmitting information, which may be present in digital (bit) values according to a code within a module, between modules, or between modules of different entities. For example, the interface 22 or the communication means 22 may comprise a circuit configured to receive and/or transmit information. For example, the interface 22 or the communication means 22 may be configured to communicate with the autonomously acting machine 100 via a network, and in particular via an intranet or the Internet.

The processor 24 or the calculating means 24 may, for example, be implemented using one or more processing units, one or more processing devices, any means for processing, such as a processor, a computer, or a programmable hardware component, which may be operated with accordingly adapted software. In other words, the described function of the processor 24 or the calculating means may as well be implemented in software, which is then executed on one or more programmable hardware components. Such hardware components may be a general-purpose processor, a digital signal processor (DSP), a microcontroller, etc.

The memory 26 or means for storing information 26 may comprise, for example, at least one element from the group of computer-readable storage media, such as a magnetic or optical storage medium, e.g. a hard disk drive, a flash memory, a floppy disk, a random access memory (RAM), a programmable read only memory (PROM), an erasable programmable read only memory (EPROM), an electronically erasable programmable read only memory (EEPROM) or a network memory. For example, the memory 26 can be a volatile or a non-volatile memory.

Machine learning algorithms are usually based on a machine learning model. In other words, the term "machine learning algorithm" may refer to a set of instructions that may be used to create, train, or use a machine learning model. The term "machine learning model" may refer to a data structure and/or a set of rules representing the learned knowledge (e.g., based on the training performed by the machine learning algorithm). In embodiments, the use of a machine learning algorithm may imply the use of an underlying machine learning model (or a plurality of underlying machine learning models). The use of a machine learning model may imply that the machine learning model and/or the data structure/set of rules that is/are the machine learning model is/are trained by a machine learning algorithm.

For example, the respective machine learning model may be an artificial neural network (ANN). ANNs are systems inspired by biological neural networks, such as those found in a retina or brain. ANNs comprise a plurality of interconnected nodes and a plurality of connections, so-called edges, between the nodes. There are usually three types of nodes, input nodes that receive input values, hidden nodes that are (only) connected to other nodes, and output nodes that provide output values. Each node may represent an artificial neuron. Each edge may send information from one node to another. The output of a node may be defined as a (non-linear) function of the inputs (e.g., the sum of its inputs). The inputs of a node may be used in the function based on a "weight" of the edge or node providing the input. The weight of nodes and/or edges may be adjusted in the learning process. In other words, training an artificial neural network may comprise adjusting the weights of the nodes and/or edges of the artificial neural network, i.e., to achieve a desired output for a given input. For example, the respective machine learning model may be a so-called deep neural network, i.e., an ANN with one or more hidden layers of nodes.

Alternatively, the respective machine learning model may be a support vector machine, a random forest model or a gradient boosting model. Support Vector Machines (i.e., support vector networks) are supervised learning models with associated learning algorithms that may be used to analyze data (e.g., in a classification or regression analysis). Support Vector Machines may be trained by providing an input with a plurality of training input values belonging to one of two categories. The Support Vector Machine may be trained to assign a new input value to one of the two categories. Alternatively, the machine learning model may be a Bayesian network, which is a probabilistic directed acyclic graphical model. A Bayesian network may represent a set of random variables and their conditional dependencies using a directed acyclic graph. Alternatively, the machine learning model may be based on a genetic algorithm, which is a search algorithm and heuristic technique that mimics the process of natural selection.

More details and aspects of the apparatus 20, the device 20, the apparatus, a corresponding computer program, and the computer system 200 are mentioned in connection with the concept or examples described before or after, such as in one of FIGS. 1a to 1b, 3 to 6. The apparatus 20, the device 20, the method, the computer program, and the computer system 200 may comprise one or more additional optional features corresponding to one or more aspects of the proposed concept or of the described examples as described above or below.

Various examples of the present disclosure deal with a service, such as a cloud-based service, for verifying system integrity and an intended functionality.

To ensure the correct operation of a robot, for example, the intactness of its critical components may be permanently guaranteed. Faults (shown as flashes in FIG. 3) in individual components of the system should be mitigated or at least be recognized so that the robot can be paused and repaired. Continued operation with faulty components may lead to damage to the robot, its environment, or the goods it handles.

FIG. 3 shows an overview of an example of an industrial robot system with an industrial robot 310. As shown in FIG. 3, faults may occur, for example, in the industrial robot 310, in sensors 320, in a sensor data processing 335 of a perception block 330, in an environment model 345 of an environment modeling block 340, or in a trajectory planning 352 or motor control 354 of a planning and monitoring block 350.

If the robot operates in an environment in which people are also present, it should be considered to be a safety-critical system in terms of functional safety (FuSa). This applies both to mobile robots (AMRs) that interact with pedestrians and to stationary robotic arms. Robotic arms that share their workspace with humans are often referred to as "cobots". Recognized faults should then be mitigated by bringing the system into a safe state, e.g., by executing an emergency stop.

The usual method to ensure that all subsystems function properly is to use redundancy. The simplest case is double redundancy: The outputs of a subsystem and its redundant counterpart (often a copy of the subsystem with different firmware) are compared; if they do not match, a fault has occurred, and the system must go into a safe state.

In the case of sensor data processing, for example, at least one redundant copy of the processing pipeline may be added (e.g., redundant physical sensors, redundant Internet service providers). When the outputs of the sensor pipelines are compared, each output may be used to monitor the respective other and failures may be recognized as they lead to differences in the data. However, adding redundant components increases the bill of materials (BOM) costs. In addition, the algorithms for reliable comparison of the sensor data are not trivial, especially in the presence of ubiquitous measurement noise, and cause a certain amount of additional expenditure in the form of computing power. Other services that work in the cloud rely on copies of the local sensor data, which are only sent to the edge for redundant processing. This does not offer complete independence from failures and is connected with considerable latency times.

Various examples of the proposed concept are based on avoiding the duplication of physical components—especially sensors—for system integrity checks. Instead, the sensor readings and the system state are compared in a virtual system, a so-called "digital twin". Since it is sufficient for most applications to perform the integrity check at a low rate (a few Hz), the integrity check may be outsourced to an "integrity service" that runs in the cloud (collective term for abstract computing resources in a data center that is accessible via the Internet). If higher rates are required for the integrity check, the service may be migrated to the so-called "edge" (that is to the "edge" of the cloud, i.e., to a computer/server that is physically close to the requesting system) or to the so-called "on-prem edge" (computer that is located on the premises of the company operating the requesting system), depending on the latency requirements. The intended checking service may also recognize deviations between the actual and predicted state of the robot caused not only by malfunctions, but also by unexpected interactions with the environment (i.e., a deviation from the intended functionality of the robot).

The proposed concept provides an integrity service that requires no redundancy of physical parts and no significant local computational effort. Instead, the analytics are designed for efficient use on an edge server or in the cloud. For example, the proposed service is (completely) independent of transport and other latencies, as sensor data and system state are sent to the service as a bundle at (exactly) the same time. The integrity service may recognize a plurality of different fault scenarios, including malfunctions due to defective parts, etc., as well as unintended functions of the robot. The digital twin in the cloud/edge may perform in-depth retrospective fault analysis thanks to additional calculation models and capabilities in the cloud.

Figure 4:
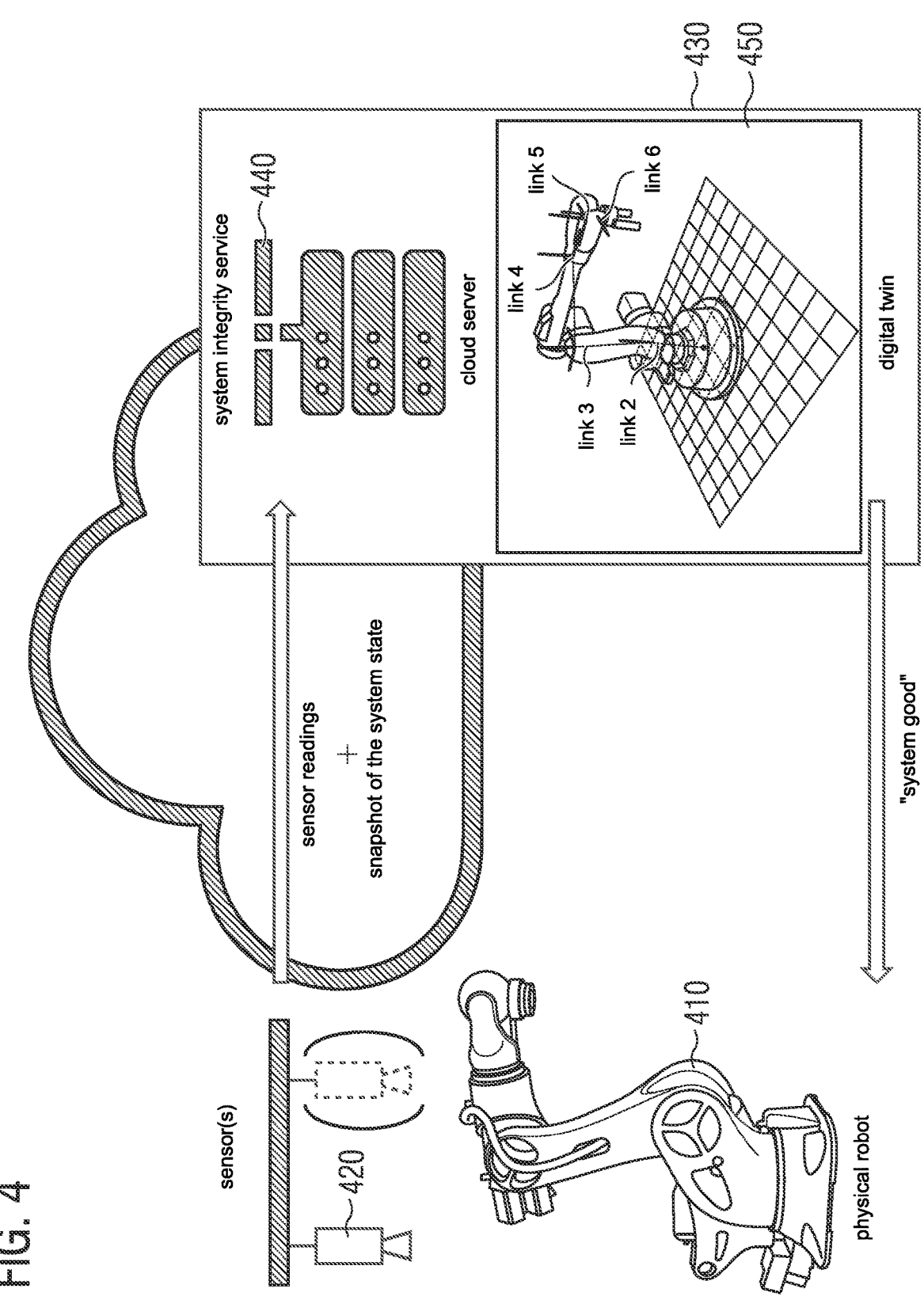
FIG. 4 shows a schematic diagram of an example of an integrity service.

FIG. 4 shows a schematic diagram of an example of an integrity service. The integrity service may, for example, be implemented using the apparatus, the device and the computer system as explained in connection with FIG. 2a. FIG. 4 shows a physical robot 410. This is observed by one or more 420 sensors (such as cameras). Sensor readings of the one or more sensors and a snapshot of the system state are transmitted to the system integrity service 440 running on a cloud server 430. The system integrity service simulates a digital twin 450 of the physical robot 410 based on the snapshot of the system state, and compares the sensor readings (i.e., sensor data) to predicted sensor readings generated using the digital twin.

For example, the proposed concept enables complete monitoring of the system integrity by using the cloud instead of additional hardware redundancy. It also enables robotics services to be outsourced to the cloud without any loss of latency. It also enables or simplifies the use of hardware not explicitly certified for robotics in safety-critical environments. By dispensing with redundant hardware, the costs of operating highly reliable or safety-critical systems may also be reduced. The proposed concept is also scalable, as it is based on the use of cloud computing services.

In the proposed concept, the integrity of the (entire) system, for example including the sensors and actuators, is checked by sending the system state at a specific point in time together with the (approximately all) corresponding sensor readings to a remote computer system (for example in the cloud or in the edge). The integrity service feeds the system state into a digital twin (i.e., the digital twin is parameterized based on the system state). For example, geometric models in the digital twin may be used to derive at least part of the scene geometry (i.e., the geometric representation of the robot and its environment, for example) at this point in time.

The sensor readings may be predicted from the scene geometry and the sensor models and be compared with the real sensor readings. A discrepancy here reveals a fault somewhere in the whole "measure-calculate-act" loop.

It is not always possible to accurately predict all sensor data using the geometric model. In the example in FIG. 5, the pixels based on the projection of the robot arm may generally be predicted. Here, the comparison does not necessarily take place at the level of the raw pixels, but may, for example, take place at the level of the extracted features such as blobs, edges, or motion vectors. FIG. 5 shows an example of a comparison on feature level. As in FIG. 5, a camera image of a camera 510 may be processed, and features may be extracted 520, such as by color segmentation 522, edge detection 524, and/or optical flow extraction 526. On the other hand, the system state is used to parameterize the digital twin and to calculate the geometry and kinematics of the robot based on the digital twin 530. Based on the geometry and kinematics, corresponding features may now be predicted 540, such as colored blobs 542, edges 544 or motion 546. The extracted features 520 and the predicted features 540 are now compared 550.

In the example of FIGS. 4 and 5, a discrepancy would literally mean that the camera does not see the arm in the position where it should be. This would be the case if either a) the camera is not working properly (image feed jammed, lens misaligned, no image at all, camera position incorrect . . . ), or b) the calculations in the control loop are incorrect (hardware fault in the computing platform, fault in the software, . . . ), or c) the actuator is not working properly (motor defective, control connection interrupted, . . . ). At least in case c), the robot arm should perform a safe stop, which is best implemented by no longer sending a "system good" report, which then triggers a safety watchdog (a system for monitoring various safety-relevant parameters) in the robot. If the system state contains redundant information, such as inputs and outputs of individual calculation components, the location of the fault may be narrowed down further by re-running these calculations on the digital twin. Another case (d)) is when unknown elements of the environment lead to unexpected behavior ("unintended functionality"), although there is no technical malfunction of the robot. This is dealt with in detail below.

Figure 6:
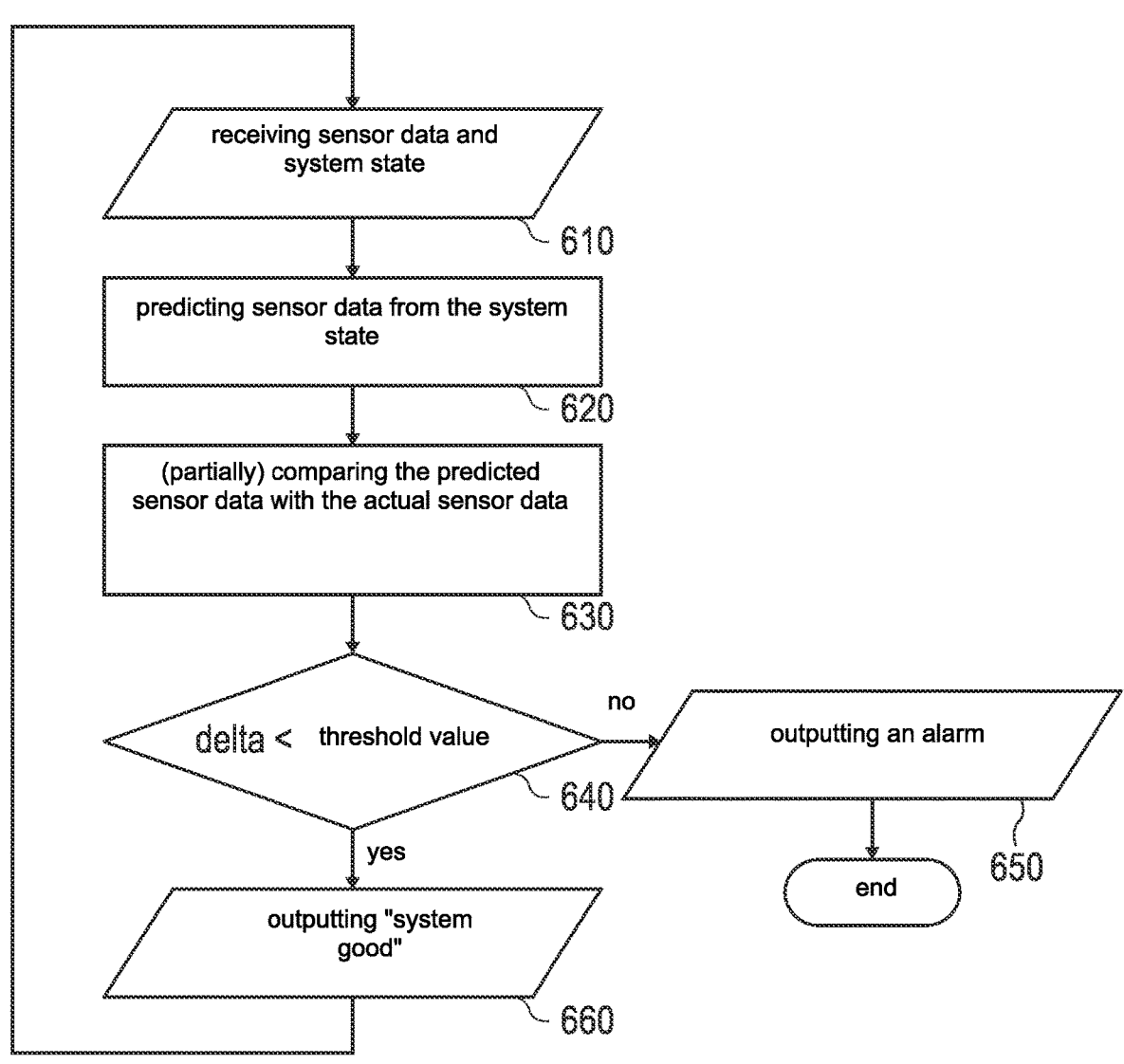
FIG. 6 shows a flowchart of an example of a process flow of the proposed concept.

FIG. 6 shows a flowchart of an example of a process flow of the proposed concept. This process flow may be implemented, for example, by the apparatus 20, the device 20, the method or the computer program described in connection with FIGS. 2a and/or 2b. The process flow begins with receiving 610 sensor data and system state. This is followed by predicting 620 sensor data from the system state. This is followed by partially comparing the predicted sensor data with the actual sensor data 630. If the difference (delta) between the received and the predicted sensor data is greater than a threshold value 640, an alarm is output 650 and the process flow ends. If the difference is less than the threshold value 640, a "system good" indication is provided via a feedback signal 660 and the process flow returns to receiving 610 sensor data and system state.

It should be noted that the integrity service generally has no requirements for low latency. The snapshot of the system state and the sensor readings generally contains all the information required to perform the integrity check for the point in time at which it was taken, regardless of how far back in the past. This type of integrity check is therefore particularly suitable for outsourcing to the cloud. The high-performance computing hardware available in the cloud enables complex twin modeling and the comparison of sensor data, while the computing requirements for the monitored robot system remain low. The transmission and calculation latencies to and/or from the cloud only limit the frequency at which the integrity check may be performed.

In some examples, unintended functions and risks may also be identified (see point d) above). For example, there may be situations in which the robot works correctly, but unexpected elements of the environment lead to an unintended functional interaction (for example, if the surface on which the robot is traveling is slippery and the robot unintentionally starts to slide). These situations may be considered in a holistic safety assessment of the system in order to meet the relevant standards but are usually difficult to recognize. The proposed concept makes it possible to recognize unintended functionality via a mismatch between the internal sensing state and the simulated state at the edge. In the example above, if the robot starts to slip due to an unexpectedly slippery surface, the sensing state is updated according to the slipping motion, while the simulation is unaware of the slippery surface and calculates a non-slipping trajectory. Therefore, the identified discrepancy will reveal the unintended functionality.

If such an identification of unintended functions and risks is performed, sensors on the respective robot (e.g., in the case of an AMR or a cobot) may, for example, be used to recognize the environment.

In other systems, the comparison of real and predicted sensor data is used, for example, to test sensors using predictive sensor models (e.g., by using Long Short-Term Memories, LSTMs). In addition, some systems use sensors to monitor the performance of a system, with the results being transmitted to the cloud. An integrity check is also performed for sensor measurements. In the proposed concept, however, a different architecture is used for this purpose, in which a digital twin is parameterized and used away from the system to be monitored (such as in a cloud environment) to determine whether the sensor data matches the system state. While other approaches either rely entirely on local calculations (closed-loop topology) or only send a copy of the local data into the cloud, the existing concept uses the already existing sensors (for example in an edge system) to create a digital twin for comparison with the local measurement data. A data flow is proposed that enables lower latency and the use of powerful cloud computing resources, resulting in deeper analysis for a high-quality, highly robust comparison of sensor data and digital twin. The use of cloud computing helps to overcome the limitations of other approaches caused by insufficient local computing resources. Due to the different angle of view of existing edge sensors, more diverse fault modes may be recognized or known faults may be interpreted more comprehensively (e.g., unintended functionalities in addition to malfunctions).

The proposed concept may be used in particular to ensure the safety of collaborative robots. In other approaches, ensuring the safety in this way requires expensive hardware and lower availability due to limited speeds. In a ROS (Robot Operating System) based system, for example, a node on the device or at least locally may subscribe to the data access points (also called topic) camera images and/joint_states (common states) of the robot. A message with the nearest timestamps may be taken from each topic/data access point and bundled into a composite message (ROS or REST, Representational State Transfer). This message is then sent to a remote computer system (such as into the cloud) for processing. Processing in the cloud then takes place outside the real-time loop and is subject to much less strict time constraints. If the comparison speed in the cloud is slower than the desired throughput, a load balancer may be used to send each of the composite messages to a different comparison service. This is possible as each composite message may be completely self-contained and comprises all the information required for "offline" processing.

While a maximum latency in the millisecond range is envisaged for robotics applications, this latency may be disregarded in the present case, as such a low latency may be achieved between the respective recorded data. The system integrity check may in turn run at a much lower rate, for example in the range of 500 ms. As sensor data and the associated system state are recorded simultaneously and then sent to the cloud in a bundle, there is only minimal latency between them, which must be considered for the actual comparison task.

While noise in other systems may lead to significant differences in simulation results, which could lead to safety stops even though there is no fault in the system, this noise may be canceled by using high-performance hardware in the cloud. The availability of a large number of computing resources enables much more sophisticated pre-processing and filtering than on the actual device. Features may be extracted from the image data in high quality so that the comparison may be performed on an abstract level at which the sensor noise is basically no longer present (see FIG. 5). A DNN (Deep Neural Network) may also be used for the actual comparison and the subsequent good/bad decision. As long as no system fault exists, the composite messages with sensor data and system state may be regarded as labeled training data for the "System Good" case. Known anomaly recognition methods may be used to recognize a fault at a later stage.

In the following, some examples of the proposed concepts are shown:

An example (e.g., example 1) relates to an apparatus (10) for an autonomously acting machine (100). The apparatus comprises an interface (12) for communicating with a computer system (200), the computer system being separate from the autonomously acting machine. The apparatus (10) includes a processor (14) for executing machine-readable instructions for providing information about an internal state of the autonomously acting machine to the computer system, obtaining a feedback signal from the computer system, the feedback signal indicating whether the sensor data for observing the autonomously acting machine is consistent with the internal state of the autonomously acting machine, and wherein the feedback signal is based on a comparison between a digital twin of the autonomously acting machine and the sensor data, wherein an internal state of the digital twin is based on the internal state of the autonomously acting machine, and operating the autonomously acting machine based on the feedback signal.

In a further example (e.g., example 2), the subject matter of a preceding example (e.g., example 1) may further comprise the processor being configured to execute the machine-readable instructions in order to stop the operation of the autonomously acting machine if the feedback signal fails to occur within a predetermined time frame.

In a further example (e.g., example 3), the subject matter of a preceding example (e.g., any one of examples 1 or 2) may further comprise the processor being configured to execute the machine-readable instructions in order to stop the operation of the autonomously acting machine if the feedback signal indicates that the sensor data is inconsistent with the internal state of the autonomously acting machine, that an appearance of an environment of the autonomously acting machine does not correspond to an expected appearance, or that the environment comprises one or more potential sources of interference.

In a further example (e.g., example 4), the subject matter of a preceding example (e.g., any one of examples 1 to 3) may further comprise the processor being configured to execute the machine-readable instructions in order to obtain the sensor data for observing the autonomously acting machine at least in part from at least one sensor (102) of the autonomously acting machine and to provide the sensor data to the computer system.

In a further example (e.g., example 5), the subject matter of a preceding example (e.g., any one of examples 1 to 4) may further comprise the processor being configured to execute the machine-readable instructions in order to obtain the sensor data for observing the autonomously acting machine at least in part from at least one sensor (104) external to the autonomously acting machine and to provide the sensor data to the computer system.

In a further example (e.g., example 6), the subject matter of a preceding example (e.g., any one of examples 1 to 5) may further comprise that the internal state of the autonomously acting machines is based on measurement data or actuation data of one or more sensors (106) or actuators (108) of the autonomously acting machine.

In a further example (e.g., example 7), the subject matter of a preceding example (e.g., any one of examples 1 to 6) may further comprise that the sensor data comprises at least of one of camera sensor data, infrared sensor data, depth sensor data, and ultrasonic sensor data.

In a further example (e.g., example 8), the subject matter of a preceding example (e.g., any one of examples 1 to 7) may further comprise at least a part of the autonomously acting machine being represented in the sensor data.

In a further example (e.g., example 9), the subject matter of a preceding example (e.g., example 8) may further comprise at least a part of the autonomously acting machine and an environment of the autonomously acting machine being represented in the sensor data.

Another example (e.g., example 10) relates to an autonomously acting machine (100), comprising the apparatus (10) according to one of the preceding examples (e.g., any one of examples 1 to 9) or according to another example In a further example (e.g., example 11), the subject matter of a preceding example (e.g., example 10) may further comprise that the autonomously acting machine is an industrial robot.

In a further example (e.g., example 12), the subject matter of a preceding example (e.g., example 10) may further comprise that the autonomously acting machine is a mobile robot.

An example (e.g., example 13) relates to an apparatus (20) for a computer system (200). The apparatus comprises an interface (22) for communicating with an autonomously acting machine (100), the computer system being separate from the autonomously acting machine. The apparatus comprises a processor (24) for executing machine-readable instructions for obtaining information about an internal state of the autonomously acting machine from the autonomously acting machine, obtaining sensor data for observing the autonomously acting machine, parameterizing a digital twin of the autonomously acting machine based on the information about the internal state of the autonomously acting machine, determining whether the sensor data is consistent with the internal state of the autonomously acting machine based on the parameterized digital twin, and providing a feedback signal to the autonomously acting machine, the feedback signal indicating whether the sensor data is consistent with the internal state of the autonomously acting machine.

In a further example (e.g., example 14), the subject matter of a preceding example (e.g., example 13) may further comprise the processor being configured to execute the machine-readable instructions in order to calculate an expected appearance of the autonomously acting machine in the sensor data based on the digital twin, to compare the expected appearance of the autonomously acting machine to an appearance of the autonomously acting machine from the sensor data, and to provide the feedback signal based on the comparison.

In a further example (e.g., example 15), the subject matter of a preceding example (e.g., example 14) may further comprise the processor being configured to execute the machine-readable instructions to determine a geometry of the autonomously acting machine based on the digital twin, and to calculate the expected appearance of the autonomously acting machine based on the geometry of the autonomously acting machine.

In a further example (e.g., example 16), the subject matter of a preceding example (e.g., any one of examples 13 to 15) may further comprise at least a part of the autonomously acting machine and an environment of the autonomously acting machine being represented in the sensor data.

In a further example (e.g., example 17), the subject matter of a preceding example (e.g., example 16) may further comprise the processor being configured to execute the machine-readable instructions in order to calculate an expected appearance of the environment of the autonomously acting machine, and to provide the feedback signal based on a comparison between the expected appearance of the environment and the representation of the environment of the autonomously acting machine from the sensor data.

In a further example (e.g., example 17), the subject matter of a preceding example (e.g., any one of examples 16 or 17) may further comprise the processor being configured to execute the machine-readable instructions in order to detect one or more potential sources of interference in the representation of the environment of the autonomously acting machine from the sensor data, and to provide the feedback signal based on the detection of the one or more potential sources of interference.

In a further example (e.g., example 19), the subject matter of a preceding example (e.g., any one of examples 13 to 18) may further comprise the processor being configured to execute the machine-readable instructions in order to suspend the feedback signal if the sensor data is inconsistent with the internal state of the autonomously acting machine, if an appearance of an environment of the autonomously acting machine does not correspond to an expected appearance, or if the environment comprises one or more potential sources of interference.

In a further example (e.g., example 20), the subject matter of a preceding example (e.g., any one of examples 13 to 18) may further comprise the processor being configured to execute the machine-readable instructions in order to provide the feedback signal such that the feedback signal indicates whether the sensor data is consistent with the internal state of the autonomously acting machine, whether an appearance of an environment of the autonomously acting machine corresponds to an expected appearance, and/or whether the environment comprises one or more potential sources of interference.

Another example (e.g., example 21) relates to a computer system (200) comprising the apparatus (20) according to a preceding example (e.g., any one of examples 13 to 20) or according to another example.

In a further example (e.g., example 22), the subject matter of a preceding example (e.g., example 21) may further comprise the computer system being a cloud server.

Another example (e.g., example 23) relates to a device (10) for an autonomously acting machine (100). The device comprises a communication means (12) for communicating with a computer system (200), the computer system being separate from the autonomously acting machine. The device (10) includes a calculating means (14) for providing information about an internal state of the autonomously acting machine to the computer system, obtaining a feedback signal from the computer system, the feedback signal indicating whether sensor data for observing the autonomously acting machine is consistent with the internal state of the autonomously acting machine, and wherein the feedback signal is based on a comparison between a digital twin of the autonomously acting machine and the sensor data, wherein an internal state of the digital twin is based on the internal state of the autonomously acting machine, and operating the autonomously acting machine based on the feedback signal.

Another example (e.g., example 24) relates to an autonomously acting machine (100) comprising the device (10) according to a preceding example (e.g., example 23) or according to another example.

An example (e.g., example 25) relates to a device (20) for a computer system (200). The device comprises a communication means (22) for communicating with an autonomously acting machine (100), the computer system being separate from the autonomously acting machine. The device comprises a calculating means (24) for obtaining information about an internal state of the autonomously acting machine from the autonomously acting machine, obtaining sensor data for observing the autonomously acting machine, parameterizing a digital twin of the autonomously acting machine based on the information about the internal state of the autonomously acting machine, determining whether the sensor data is consistent with the internal state of the autonomously acting machine based on the parameterized digital twin, and providing a feedback signal to the autonomously acting machine, the feedback signal indicating whether the sensor data is consistent with the internal state of the autonomously acting machine.

Another example (e.g., example 26) relates to a computer system (200) comprising the device (20) according to any one of the preceding examples (e.g., example 25).

An example (e.g., example 27) relates to a method for an autonomously acting machine (100). The method comprises providing (110) information about an internal state of the autonomously acting machine to a computer system (200), wherein the computer system is separate from the autonomously acting machine. The method comprises obtaining (120) a feedback signal from the computer system, the feedback signal indicating whether sensor data for observing the autonomously acting machine is consistent with the internal state of the autonomously acting machine, and wherein the feedback signal is based on a comparison between a digital twin of the autonomously acting machine and the sensor data, wherein an internal state of the digital twin is based on the internal state of the autonomously acting machine. The method comprises operating (130) the autonomously acting machine based on the feedback signal.

An example (e.g., example 28) relates to an autonomously acting machine (100) configured to perform the method according to any one of the preceding examples (e.g., example 27).

An example (e.g., example 29) relates to a method for a computer system (200). The method comprises obtaining (210) information about an internal state of an autonomously acting machine from the autonomously acting machine, wherein the computer system is separate from the autonomously acting machine. The method comprises obtaining (215) sensor data for observing the autonomously acting machine. The method comprises parameterizing (220) a digital twin of the autonomously acting machine based on the information about the internal state of the autonomously acting machine. The method comprises determining (230) whether the sensor data is consistent with the internal state of the autonomously acting machine based on the parameterized digital twin. The method comprises providing (240) a feedback signal to the autonomously acting machine, the feedback signal indicating whether the sensor data is consistent with the internal state of the autonomously acting machine.

An example (e.g., example 30) relates to computer system (200) configured to perform the method according to any one of the preceding examples (e.g., example 29).

An example (e.g., example 31) relates to a system comprising the autonomously acting machine (100) according to any one of the preceding examples (e.g., any one of examples 10-12, 24 or 28), and the computer system (200) according to any one of the preceding examples (e.g., any one of examples 21-22, 26 or 30).

An example (e.g., example 32) relates to a non-transitory, machine-readable storage medium containing a program code that, when executed, causes a machine to perform any one of the preceding methods (e.g., of example 27 or 29).

An example (e.g., example 33) relates to a computer program having a program code for performing any one of the preceding methods (e.g., example 27 or 29), when the computer program is executed on a computer, a processor, or a programmable hardware component.

An example (e.g., example 34) relates to a machine-readable memory containing machine-readable instructions that, when executed, implement a method, or implement an apparatus as claimed in any one of the appended claims or shown in any one of the examples.

The aspects and features described in relation to a particular one of the previous examples may also be combined with one or more of the further examples to replace an identical or similar feature of that further example or to additionally introduce the features into the further example.

Examples may further be or relate to a (computer) program including a program code to execute one or more of the above methods when the program is executed on a computer, a processor, or another programmable hardware component. Thus, steps, operations, or processes of different ones of the methods described above may also be executed by programmed computers, processors, or other programmable hardware components. Examples may also cover program storage devices, such as digital data storage media, which are machine-, processor- or computer-readable and encode and/or comprise machine-executable, processor-executable or computer-executable programs and instructions. The program storage devices may comprise or be, for instance, digital memories, magnetic storage media such as magnetic disks and magnetic tapes, hard drives, or optically readable digital data storage media. Other examples may also include computers, processors, control units, (field) programmable logic arrays ((F)PLAs), (field) programmable gate arrays ((F)PGAs), graphics processor units (GPU), application-specific integrated circuits (ASICs), integrated circuits (ICs)

or system-on-a-chip (SoCs) systems programmed to execute the steps of the methods described above.

It is further understood that the disclosure of several steps, processes, operations, or functions disclosed in the description or claims shall not be construed to imply that these operations are necessarily dependent on the order described, unless explicitly stated in the individual case or necessary for technical reasons. Therefore, the previous description does not limit the execution of several steps or functions to a certain order. Furthermore, in further examples, a single step, function, process, or operation may include and/or be broken up into several sub-steps, -functions, -processes or -operations.

If some aspects in the previous sections have been described in relation to an apparatus or system, these aspects should also be understood as a description of the corresponding method. In this case, for example, a block, an apparatus or a functional aspect of the device or system may correspond to a feature, such as a method step, of the corresponding method. Accordingly, aspects described in relation to a method shall also be understood as a description of a corresponding block, a corresponding element, a property or a functional feature of a corresponding apparatus or a corresponding system.

The following claims are hereby incorporated in the detailed description, wherein each claim may stand on its own as a separate example. It should also be noted that—although in the claims a dependent claim refers to a particular combination with one or more other claims—other examples may also include a combination of the dependent claim with the subject matter of any other dependent or independent claim. Such combinations are hereby explicitly proposed, unless it is stated in the individual case that a particular combination is not intended. Furthermore, features of a claim should also be included for any other independent claim, even if that claim is not directly defined as dependent on that other independent claim.

The invention claimed is:

1. An apparatus for an autonomously acting machine, the apparatus comprising:
   at least one sensor and/or at least one actuator for obtaining measurement data and/or actuation data, respectively, of the autonomously acting machine;
   an interface for communicating with a computer system, the computer system being separate from the autonomously acting machine; and
   a processor for executing machine-readable instructions to:
      generate information about an internal state of the autonomously acting machine based on the measurement data and/or the actuation data;
      provide the information about the internal state of the autonomously acting machine to the computer system,
      obtain a feedback signal from the computer system, the feedback signal indicating whether sensor data for observing the autonomously acting machine is consistent with the internal state of the autonomously acting machine, wherein the feedback signal is based on a comparison between predicted sensor data generated by a digital twin of the autonomously acting machine and the observed sensor data, wherein the digital twin is a virtual model configured to simulate behavior of the autonomously acting machine and an internal state of the digital twin is based on the internal state of the autonomously acting machine, and operate the autonomously acting machine based on the feedback signal.

2. The apparatus of claim 1, wherein the processor is configured to execute the machine-readable instructions to stop the operation of the autonomously acting machine if the feedback signal fails to occur within a predetermined time frame.

3. The apparatus of claim 1, wherein the processor is configured to execute the machine-readable instructions to stop the operation of the autonomously acting machine if the feedback signal indicates that the sensor data is inconsistent with the internal state of the autonomously acting machine, that an appearance of an environment of the autonomously acting machine does not correspond to an expected appearance, or that the environment comprises one or more potential sources of interference.

4. The apparatus of claim 1, wherein the processor is configured to execute the machine-readable instructions to obtain the sensor data for observing the autonomously acting machine at least in part from at least one sensor of the autonomously acting machine and to provide the sensor data to the computer system.

5. The apparatus of claim 1, wherein the processor is configured to execute the machine-readable instructions to obtain the sensor data for observing the autonomously acting machine at least in part from at least one sensor external to the autonomously acting machine and to provide the sensor data to the computer system.

6. The apparatus of claim 1, wherein the sensor data comprises at least of one of camera sensor data, infrared sensor data, depth sensor data, and ultrasonic sensor data.

7. The apparatus of claim 1, wherein at least a part of the autonomously acting machine is represented in the sensor data, or wherein at least a part of the autonomously acting machine and an environment of the autonomously acting machine is represented in the sensor data.

8. An industrial robot comprising the apparatus of claim 1.

9. A mobile robot comprising the apparatus of claim 1.

10. An apparatus for a computer system, the apparatus comprising:

an interface for communicating with an autonomously acting machine, the computer system being separate from the autonomously acting machine; and a processor for executing machine-readable instructions to:

implement a digital twin that is configured to simulate behavior of the autonomously acting machine;

obtain information about an internal state of the autonomously acting machine from the autonomously acting machine, obtain sensor data for observing the autonomously acting machine, parameterize the digital twin of the autonomously acting machine based on the information about the internal state of the autonomously acting machine, determine whether the sensor data is consistent with the internal state of the autonomously acting machine based on the parameterized digital twin, and send a feedback signal to the autonomously acting machine to operate the autonomously acting machine based on the feedback signal, the feedback signal indicating whether the sensor data is consistent with the internal state of the autonomously acting machine, wherein the feedback signal is generated based on a comparison between predicted sensor data generated by the digital twin of the autonomously acting machine and the observed sensor data.

11. The apparatus of claim 10, wherein the processor is configured to execute the machine-readable instructions to calculate an expected appearance of the autonomously acting machine in the sensor data based on the digital twin, to compare the expected appearance of the autonomously acting machine to an appearance of the autonomously acting machine from the sensor data, and to provide the feedback signal based on the comparison.

12. The apparatus of claim 11, wherein the processor is configured to execute the machine-readable instructions to determine a geometry of the autonomously acting machine based on the digital twin, and to calculate the expected appearance of the autonomously acting machine based on the geometry of the autonomously acting machine.

13. The apparatus of claim 10, wherein at least a part of the autonomously acting machine and an environment of the autonomously acting machine is represented in the sensor data, wherein the processor is configured to execute the machine-readable instructions to calculate an expected appearance of the environment of the autonomously acting machine, and to provide the feedback signal based on a comparison between the expected appearance of the environment and the representation of the environment of the autonomously acting machine from the sensor data.

14. The apparatus of claim 13, wherein the processor is configured to execute the machine-readable instructions to detect one or more potential sources of interference in the representation of the environment of the autonomously acting machine from the sensor data, and to provide the feedback signal based on the detection of the one or more potential sources of interference.

15. The apparatus of claim 10, wherein the processor is configured to execute the machine-readable instructions to suspend the feedback signal if the sensor data is inconsistent with the internal state of the autonomously acting machine, if an appearance of an environment of the autonomously acting machine does not correspond to an expected appearance, or if the environment comprises one or more potential sources of interference.

16. The apparatus of claim 10, wherein the processor is configured to execute the machine-readable instructions to provide the feedback signal such that the feedback signal indicates whether the sensor data is consistent with the internal state of the autonomously acting machine, whether an appearance of an environment of the autonomously acting machine corresponds to an expected appearance, and/or whether the environment comprises one or more potential sources of interference.

17. A computer system comprising the apparatus of claim 10.

18. A method for an autonomously acting machine, the method comprising:

obtaining measurement data and/or actuation data of the autonomously acting machine by using at least one sensor and/or at least one actuator for, respectively;

generating information about an internal state of the autonomously acting machine based on the measurement data and/or the actuation data;

providing the information about the internal state of the autonomously acting machine to a computer system, wherein the computer system is separate from the autonomously acting machine, obtaining a feedback signal from the computer system, the feedback signal indicating whether sensor data for observing the autonomously acting machine is consistent with the internal state of the autonomously acting machine, wherein the feedback signal is based on a comparison between predicted sensor data generated by a digital twin of the autonomously acting machine and the observed sensor data, wherein the digital twin is a virtual model configured to simulate behavior of the autonomously acting machine and an internal state of the digital twin is based on the internal state of the autonomously acting machine, and operating the autonomously acting machine based on the feedback signal.

19. A non-transitory, machine-readable storage medium containing a program code that, when executed, causes a machine to perform the method of claim 18.

\* \* \* \* \*